United States Patent
Chittigala et al.

(10) Patent No.: US 9,971,589 B2
(45) Date of Patent: May 15, 2018

(54) UPGRADE MANAGEMENT FOR A SHARED POOL OF CONFIGURABLE COMPUTING RESOURCES

(71) Applicant: International Business Machines Corporation, Armonk, NY (US)

(72) Inventors: Aruna S. Chittigala, Hyderabad (IN); Jes K. Chittigala, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 15/289,820

(22) Filed: Oct. 10, 2016

(65) Prior Publication Data

US 2018/0101374 A1    Apr. 12, 2018

(51) Int. Cl.
G06F 9/44 (2006.01)
G06F 9/445 (2018.01)
H04L 29/08 (2006.01)
G06F 9/50 (2006.01)
G06F 11/14 (2006.01)

(52) U.S. Cl.
CPC ............... *G06F 8/65* (2013.01); *H04L 67/10* (2013.01); *H04L 67/1097* (2013.01); *H04L 67/327* (2013.01); *H04L 67/34* (2013.01); *G06F 9/5077* (2013.01); *G06F 11/1415* (2013.01)

(58) Field of Classification Search
CPC .............................................. G06F 8/30–8/78
See application file for complete search history.

(56) References Cited

U.S. PATENT DOCUMENTS

| 8,387,041 B2 * | 2/2013 | Branda ................ G06F 9/5077 718/1 |
| 8,495,618 B1 | 7/2013 | Inbaraj et al. |
| 8,676,762 B2 * | 3/2014 | Pafumi ............... G06F 11/1415 707/640 |
| 8,949,188 B2 * | 2/2015 | Pafumi ............... G06F 11/1415 707/640 |

(Continued)

OTHER PUBLICATIONS

Deboosere, Lien et al., "Cloud-Based Desktop Services for Thin Clients," 2012, pp. 60-67.*

(Continued)

*Primary Examiner* — Thuy Dao
*Assistant Examiner* — Christopher J Franco
(74) *Attorney, Agent, or Firm* — Christopher M. Coy

(57) ABSTRACT

Disclosed aspects relate to upgrade management for a shared pool of configurable computing resources having a set of logical partition (LPAR) nodes which includes a set of established members. Performance of a live kernel update (LKU) operation may be initiated with respect to a first original LPAR node. Generation of a first surrogate LPAR node to succeed the first original LPAR node may be initiated. The first surrogate LPAR node may be identified as a new original LPAR node. The first surrogate LPAR node may be joined with the set of LPAR nodes. In response to the first surrogate LPAR node joining the set of LPAR nodes, the first surrogate LPAR node may be identified as a new surrogate LPAR node. The first surrogate LPAR node may be established as a first established member, thereby removing the first original LPAR node from the set of established members.

20 Claims, 9 Drawing Sheets

(56) References Cited

U.S. PATENT DOCUMENTS

| | | | |
|---|---|---|---|
| 2009/0178049 A1* | 7/2009 | Branda | G06F 9/5077 |
| | | | 718/104 |
| 2010/0162226 A1 | 6/2010 | Borissov et al. | |
| 2012/0150805 A1* | 6/2012 | Pafumi | G06F 11/1415 |
| | | | 707/640 |
| 2013/0254165 A1* | 9/2013 | Pafumi | G06F 11/1415 |
| | | | 707/652 |
| 2015/0046745 A1 | 2/2015 | Dhavale et al. | |
| 2016/0092203 A1 | 3/2016 | Filali-Adib et al. | |
| 2017/0090772 A1* | 3/2017 | Kripalani | H04L 67/1097 |
| 2017/0149931 A1* | 5/2017 | Lochhead | H04L 67/327 |

OTHER PUBLICATIONS

Naik, Vijay K. et al., "Adaptive Resource Sharing in a Web Services Environment," 2004, pp. 311-330.*

Wolski, Rich, "Experiences with Predicting Resource Performance On-line in Computational Grid Settings," 2003, pp. 41-49.*

Jia, Qiong et al., "A Novel Method of Baseband Pool Resource Allocation in Cloud Radio Access Network System," 2015, pp. 2034-2038.*

Bajpai, Kartikeya et al., "NGO Collaborations—Sharing and Pooling projects," 2010, pp. 410-416.*

Abdel-Rahman, Mohammad J. et al., "Dimensioning Virtualized Wireless Access Networks from a Common Pool of Resources ," /2016, pp. 1-6.*

Mell, Peter, et al, The NIST Definition of Cloud Computing, National Institute of Standards and Technology, Oct. 7, 2009, Version 15, NIST, Gaithersburg, MD, US.

He, Wanda; "Virtualize Business Critical Applications"; <https://blogs.vmware.com/apps/2011/11/sql-server-rolling-patch-upgrade-using-standby-vm.html>; Nov. 30, 2011.

International Business Machines Corporation; "AIX Live Update"; <https://www.ibm.com/developerworks/community/blogs/cgaix/resource/AIXLiveUpdateblog.pdf?lang=en>; Oct. 5, 2015.

* cited by examiner

UPGRADE MANAGEMENT FOR A SHARED POOL OF CONFIGURABLE COMPUTING RESOURCES

BACKGROUND

This disclosure relates generally to computer systems and, more particularly, relates to operating system upgrade management for a shared pool of configurable computing resources having a set of logical partition (LPAR) nodes which includes a set of established members. The amount of data that needs to be managed by enterprises is increasing. System upgrades for network nodes may be desired to be performed as efficiently as possible. As data needing to be managed increases, the need for efficient system upgrade management may increase.

SUMMARY

Aspects of the disclosure relate to upgrade management for a shared pool of configurable computing resources having a set of logical partition (LPAR) nodes which includes a set of established members. A live kernel update (LKU) operation may be initiated for an original LPAR node of an LPAR node cluster. A surrogate LPAR node may be generated for the original LPAR node engaged in the LKU operation. An upgrade may be initiated with respect to the surrogate LPAR node. Cluster services may begin on the surrogate LPAR node, and the surrogate LPAR node can be recognized as a surrogate node by other established LPAR nodes of the cluster. Upon completion of the upgrade, the surrogate LPAR node may be established as a member of the LPAR node cluster, and the original LPAR node may be removed from the cluster.

Disclosed aspects relate to upgrade management for a shared pool of configurable computing resources having a set of logical partition (LPAR) nodes which includes a set of established members. Performance of a live kernel update (LKU) operation may be initiated with respect to a first original LPAR node. Generation of a first surrogate LPAR node to succeed the first original LPAR node may be initiated. The first surrogate LPAR node may be identified as a new original LPAR node. The first surrogate LPAR node may be joined with the set of LPAR nodes. In response to the first surrogate LPAR node joining the set of LPAR nodes, the first surrogate LPAR node may be identified as a new surrogate LPAR node. The first surrogate LPAR node may be established as a first established member, thereby removing the first original LPAR node from the set of established members.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
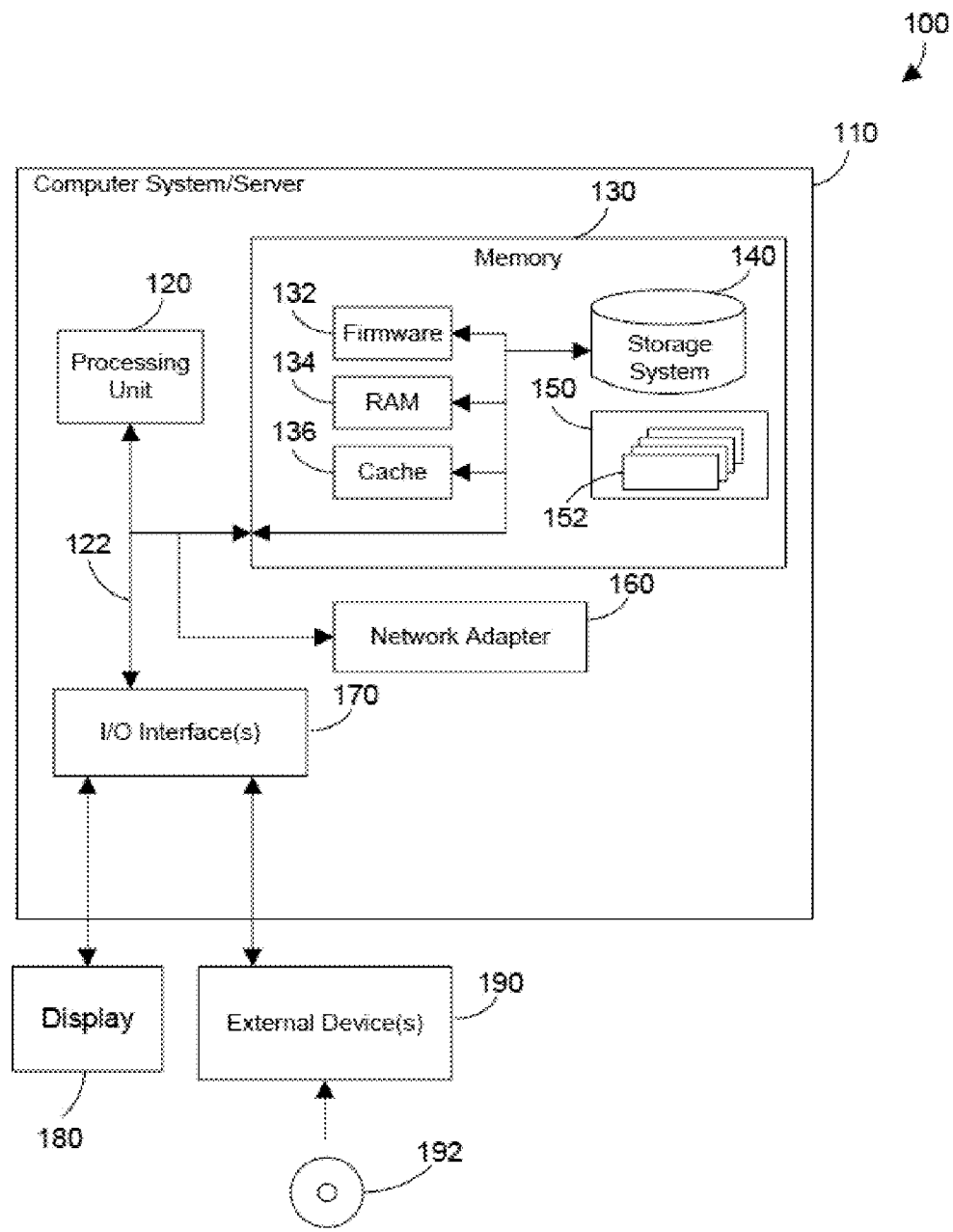
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to upgrade management for a shared pool of configurable computing resources having a set of logical partition (LPAR) nodes which includes a set of established members. A live kernel update (LKU) operation may be initiated for an original LPAR node of an LPAR node cluster. A surrogate LPAR node may be generated for the original LPAR node engaged in the LKU operation. An upgrade (e.g., new software version) may be initiated with respect to the surrogate LPAR node. Cluster services may begin on the surrogate LPAR node and the surrogate LPAR node can be recognized as a surrogate node by other established LPAR nodes of the cluster. Upon completion of the upgrade, the surrogate LPAR node may be established as a member of the LPAR node cluster, and the original LPAR node may be removed from the cluster. Leveraging surrogate nodes for dynamic live kernel update with respect to a cluster of LPAR nodes may be associated with reduced downtime, application availability streamlined system upgrades, and cluster reliability.

System downtime and system resource utilization represent possible challenges related to managing upgrades for LPAR node clusters. Installing upgrades (e.g., cluster system software) to logical partitions can often result in system downtime (e.g., install time, machine restarts), interrupted service availability, and increased disk usage (e.g., redundant node creation). Accordingly, aspects of the disclosure relate to initiating upgrades (e.g., LKU operations) with respect to a surrogate node generated for an original node of the cluster. The original node may maintain cluster activities and system/application availability until completion of the upgrades to the surrogate node, at which point the surrogate node may join the cluster. Failover-failback event management protocols may be acquired (e.g., learned, imported) by the surrogate node from the original node to facilitate asset management in the case of a failover-failback event. The surrogate node may replace the original node as an established member of the cluster, and the original node may be removed from the node cluster. In this way, continuous application and service availability for the node cluster may be maintained (e.g., as upgrades are performed without node downtime) and the disk storage needed for upgrades may be reduced (e.g., as upgrades can be performed for cluster nodes without excess LPAR node creation).

Aspects of the disclosure include a method, system, and computer program product for a shared pool of configurable computing resources having a set of logical partition (LPAR) nodes which includes a set of established members. Aspects of the disclosure relate to initiating performance of a live kernel update (LKU) operation with respect to a first original LPAR node which has a set of original assets. Performance of the LKU operation may be initiated when the set of original assets are running on the first original LPAR node. Generation of a first surrogate LPAR node which has a set of successor assets to succeed the set of original assets may be initiated. Generation of the first surrogate LPAR node may be initiated when the set of original assets are running on the first original LPAR node. The first surrogate LPAR node may be identified as a new original LPAR node in advance of the first surrogate LPAR node joining the set of LPAR nodes.

Aspects of the disclosure relate to joining the first surrogate LPAR node with the set of LPAR nodes. In response to joining of the first surrogate LPAR node with the set of LPAR nodes, presence of twin nodes may be sensed. In response to the first surrogate LPAR node joining the set of LPAR nodes, the first surrogate LPAR node may be identified as a new surrogate LPAR node. The first surrogate LPAR node may learn a cluster state of the first original LPAR node with respect to handling a set of failover-failback operations. The first surrogate LPAR node may be established as the first established member of the set of established members, thereby removing the first original LPAR node from the set of established members. In embodiments, in response to establishing the first surrogate LPAR node as the first established member of the set of established members, the first original LPAR node may be removed from the set of LPAR nodes. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
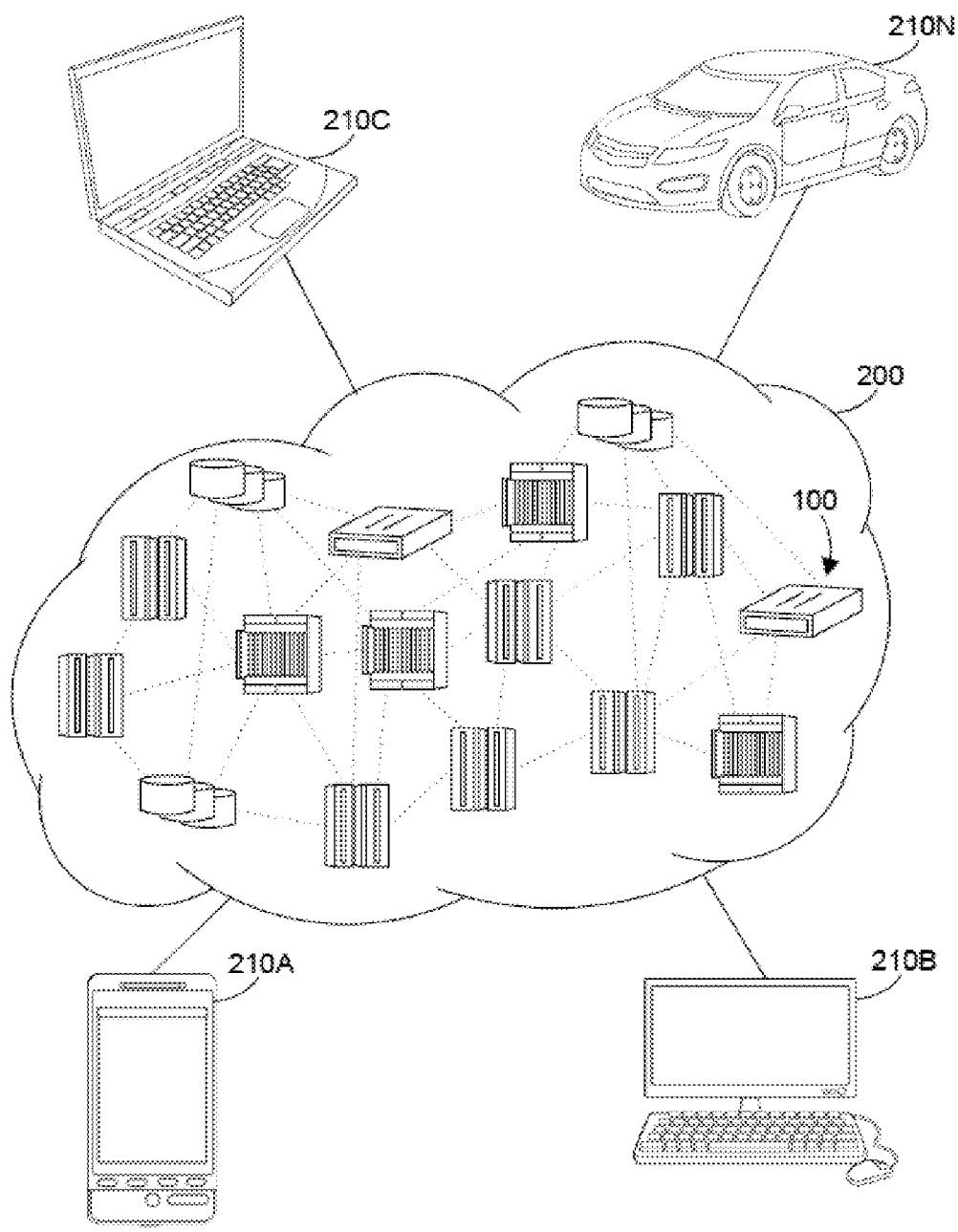
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
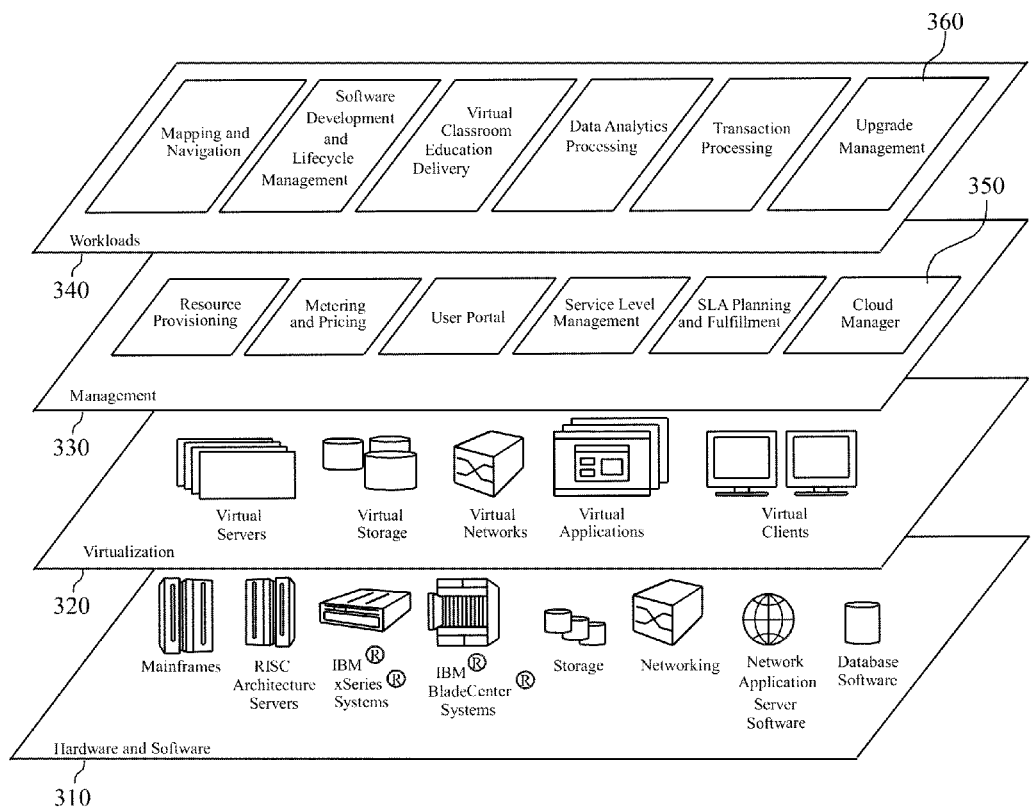
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and upgrade management 360, which may be utilized as discussed in more detail below.

Figure 4:
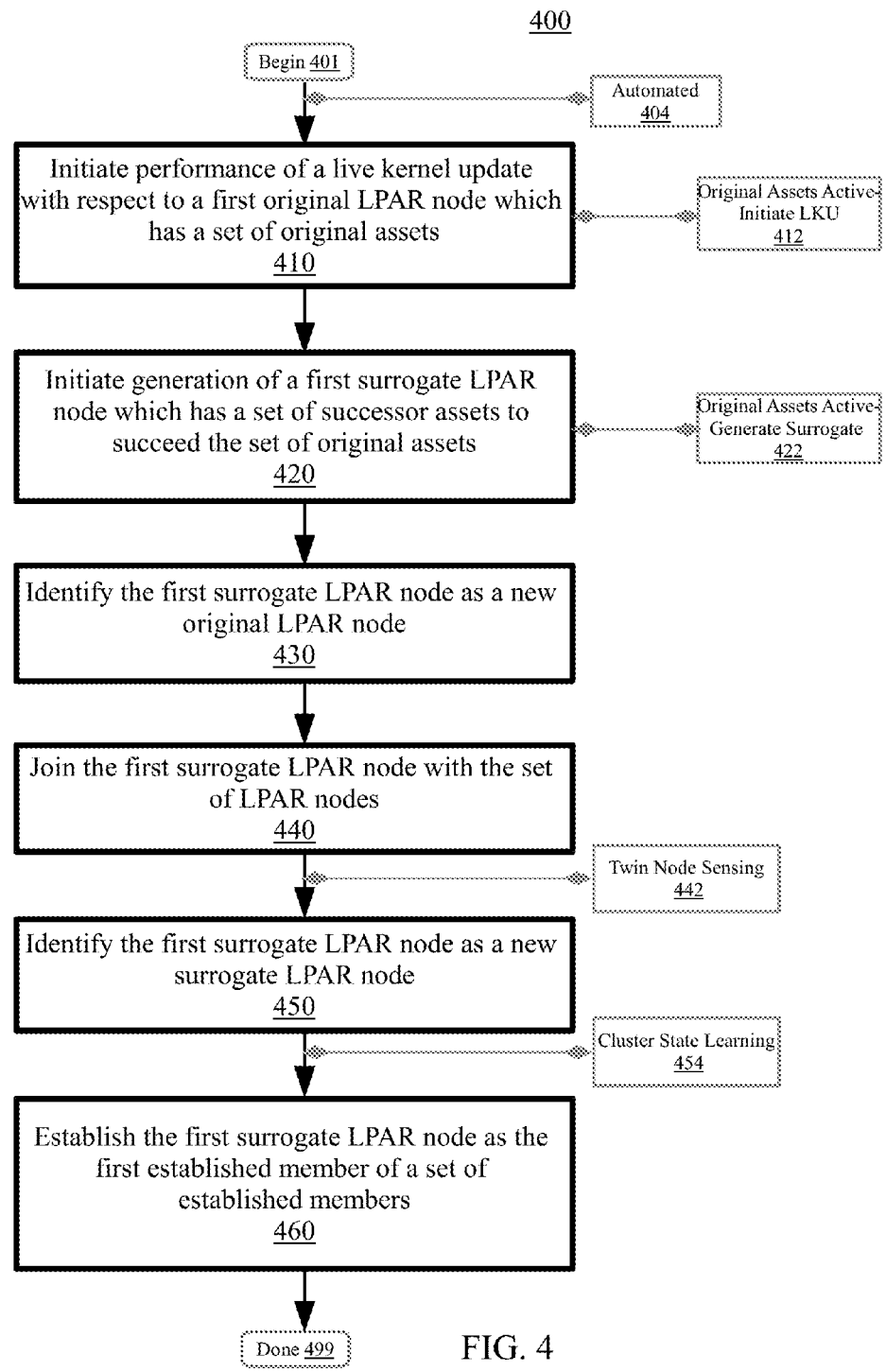
FIG. 4 is a flowchart illustrating a method of upgrade management for a shared pool of configurable computing resources having a set of logical partition (LPAR) nodes which includes a set of established members, according to embodiments.

FIG. 4 is a flowchart illustrating a method 400 of upgrade management for a shared pool of configurable computing resources having a set of logical partition (LPAR) nodes which includes a set of established members. Aspects of FIG. 4 relate to dynamically (e.g., in real-time, ongoing, on-the-fly) upgrading a set of LPAR nodes using a surrogate LPAR node in a singular fashion. The set of LPAR nodes may include a cluster, group, array, or other collection of logical partitions. Generally, the set of LPAR nodes can include virtual machines or other emulated computer system environments based on computer architectures and configured to perform one or more tasks or functions. In embodiments, the set of LPAR nodes can include subsets of a computer's hardware resources that are virtualized as a separate computer and configured to provide a complete system platform and operating system environment for program execution. The set of LPAR nodes may include a set of established members. The set of established members may include a subset of the set of LPAR nodes that are verified as stable, persistent, or reliable (e.g., dependable, trustworthy). The set of established members may include a subset of LPAR nodes that are configured with protocols for failover-failback management (e.g., switching system processes to a secondary hardware component in response to an irregularity/error event, and subsequent restoration of the malfunctioning component). In embodiments, surrogate nodes may be used to facilitate upgrades (e.g., cluster software updates) for the set of LPAR nodes. Leveraging surrogate nodes for dynamic live kernel update with respect to a cluster of LPAR nodes may be associated with reduced downtime, application availability streamlined system upgrades, and cluster reliability. The method 400 may begin at block 401.

In embodiments, the initiating, the initiating, the identifying, the joining, the identifying, the establishing, and other steps described herein may each occur in an automated fashion without user intervention at block 404. In embodiments, the initiating, the initiating, the identifying, the joining, the identifying, the establishing, and other steps described herein may be carried out by an internal upgrade management module maintained in a persistent storage device of the shared pool of configurable computing resources (e.g., database, central management server). In certain embodiments, the initiating, the initiating, the identifying, the joining, the identifying, the establishing, and other steps described herein may be carried out by an external upgrade management module hosted by a remote computing device or server (e.g., accessible via a subscription, usage-based, or other service model). In this way, aspects of upgrade management may be performed using automated computing machinery without manual action. Other methods of performing the steps described herein are also possible.

At block 410, performance of a live kernel update (LKU) operation may be initiated with respect to a first original LPAR node which has a set of original assets. Generally, initiating can include starting, launching, introducing, commencing, or otherwise beginning performance of the LKU operation with respect to the first original LPAR node. The first original LPAR node may include a particular member (e.g., established member) of the set of LPAR nodes. The first original LPAR node may include a logical partition that is associated with a pending upgrade (e.g., cluster software update, operating system update) or migration. The first original LPAR node may include a set of original assets. The set of original assets may include workloads, applications, software programs, or other data or information. As an example, the set of original assets may include an application programming interface (API) for a data streaming application. In embodiments, as described herein, a live kernel update operation may be initiated with respect to the first LPAR node. The LKU operation may include a procedure to patch, amend, fix, upgrade, or otherwise update one or aspects of the software environment of the first original LPAR node. In embodiments, initiating performance of the LKU operation may include detecting the launch of a LKU management widget to configure the first original LPAR node for upgrade. For instance, the LKU management widget may identify the internet protocol (IP) address, communication ports, and virtual input/output server (VIOS) interface to be used for cluster communication during the LKU operation for the first original LPAR node. Other methods of initiating performance of the LKU update operation for the first original LPAR node are also possible.

In embodiments, performance of the LKU operation may be initiated when the set of original assets are running on the first original LPAR node at block 412. Aspects of the disclosure relate to the recognition that, in some situations, it may be desirable to perform the LKU operation for the first original LPAR node while mitigating (e.g., reducing, avoiding) system downtime. Accordingly, aspects of the disclosure relate to initiating performance of the LKU operation while the set of original assets are running (e.g., active, in-use) on the first original LPAR node (e.g., to avoid system restarts and application shutdown during upgrade). In embodiments, initiating performance of the LKU operation while the original assets are running may include collecting information about the node for use during the upgrade process (e.g., system properties, performance characteristics, workload attributes). As an example, consider a situation in which a set of original assets including an API for a data streaming application are actively running on the first original LPAR node. An LKU management widget may collect information about the degree of system usage (e.g., disk storage, processor resources, memory resources), input and output data traffic, and other aspects of the in-use first LPAR node (e.g., for use when generating a first surrogate LPAR node for the first original LPAR node). In embodiments, initiating performance of the LKU operation when the set of original assets are running may include targeting (e.g., identifying, marking, tagging) the first original LPAR node for upgrade, and beginning one or more preliminary LKU processes. Other methods of initiating performance of the LKU operation when the set of original assets are running are also possible.

At block 420, generation of a first surrogate LPAR node to succeed the first original LPAR node as a first established member of the set of established members may be initiated. The first surrogate LPAR node may have a set of successor assets to succeed the set of original assets. Generally, initiating can include starting, launching, instantiating, commencing, or otherwise beginning generation (e.g., creation, production, origination) of the first surrogate LPAR node. In embodiments, aspects of the disclosure relate to performing upgrades (e.g., cluster software updates) on a first surrogate LPAR node while the first original LPAR node continues cluster activities (e.g., to maintain service and application availability). The first surrogate LPAR node may include a copy, reproduction, substitute, or virtualized duplicate of the first original node. The first surrogate LPAR node may maintain the same operating configuration, system parameters, and other characteristics of the first original node. In embodiments, the first surrogate LPAR node may have a set of successor assets. The set of successor assets may include workloads, applications, software programs, or other data or information to replace or succeed the set of original assets (e.g., upon upgrade completion). In embodiments, initiating generation of the first surrogate LPAR node may include creating a new logical partition and replicating the system configuration of the first original LPAR node on the new logical partition to create a duplicate of the original LPAR node. In certain embodiments, a new (e.g., newest, up-to-date) system configuration may be installed on the first surrogate LPAR node (e.g., newest software version, newest cluster software version). Other methods of initiating generation of the first surrogate LPAR node to succeed the first original LPAR node are also possible.

Consider the following example. A pending LKU operation may be detected with respect to a first original LPAR node. An LKU management widget may be launched, and collect data regarding the IP address, communication ports, virtual input/output server (VIOS) interface, system properties, workload attributes, and other information for the first original LPAR node. In embodiments, the LKU management widget may initiate set-up of a first surrogate LPAR node corresponding to the first original LPAR node. For instance, the LKU management widget may identify an available storage volume (e.g., corresponding to the same storage size as the first original LPAR node), and format the storage volume to configure it as a new logical partition. A system image may be generated to copy the system configuration, parameters, and assets of the first original LPAR node, and the system image may be cloned to the newly formatted logical partition to generate the first surrogate LPAR node. Other methods of generating the first surrogate LPAR node are also possible.

In embodiments, generation of the first surrogate LPAR node having the set of successor assets may be initiated when the set of original assets are running on the first original LPAR node at block 422. Aspects of the disclosure relate to the recognition that, in some situations, it may be desirable to generate the first surrogate LPAR node while mitigating (e.g., reducing, avoiding) system downtime. Accordingly, aspects of the disclosure relate to initiating generation of the first surrogate LPAR node while the set of original assets are running on the first original LPAR node. In embodiments, initiating generation of the first surrogate LPAR node while the set of original assets are running may include creating a shadow copy (e.g., snapshot of the first original node at a given point in time), and subsequently performing a copy-on-write (e.g., record, duplication of changes made to modifiable resources) for any disk modifications made by the set of original assets while running (e.g., after creation of the shadow copy). In this way, disk modifications made by the set of original assets while running may be preserved in a separate disk location such that a complete image of the first original LPAR node may be maintained. Accordingly, the shadow copy together with subsequent disk modifications may be used to generate the first surrogate LPAR node while the set of original assets are running on the first original LPAR node (e.g., without data loss or system downtime) Other methods of generating the first surrogate LPAR node are also possible.

At block 430, the first surrogate LPAR node may be identified as a new original LPAR node. The first surrogate LPAR node may be identified as a new original LPAR node in advance of the first surrogate LPAR node joining the set of LPAR nodes. Generally, identifying can include detecting, classifying, sensing, categorizing, or otherwise determining the first surrogate LPAR node as a new original LPAR node. Aspects of the disclosure relate to recognizing the first surrogate LPAR node as a new LPAR node added to the set of LPAR nodes. In embodiments, identifying may include labeling or indicating the first surrogate LPAR node as a new original LPAR node. In this way, the first surrogate LPAR node may be managed (e.g., handled, treated) in the same way as other established LPAR nodes in the set of LPAR nodes (e.g., have the same security permissions, management protocols). As an example, identifying may include marking a data entry corresponding to the first surrogate LPAR node with a provisional membership tag in a network logical topology database. The provisional membership tag may designate the first surrogate LPAR node as a new original LPAR node configured to be managed in the same fashion as established members of the set of LPAR nodes (e.g., while distinguishing that the first surrogate LPAR node is not an established member). For instance, in certain embodiments, the first surrogate LPAR node may be utilized as part of a failover or failback operation (e.g., in the same way as other LPAR nodes of the set). Other methods of identifying the first surrogate LPAR node as a new original LPAR node are also possible.

At block 440, the first surrogate LPAR node may be joined with the set of LPAR nodes. Generally, joining can include connecting, coupling, associating, grouping, adding, or otherwise including the first surrogate LPAR node together with the set of LPAR nodes. In embodiments, aspects of the disclosure relate to incorporating the first surrogate LPAR node into the cluster of LPAR nodes to facilitate application availability, cluster upgrade management, and data communication between LPAR nodes. In embodiments, joining can include validating the first surrogate LPAR node as a fully operational node, and merging it with the set of LPAR nodes. As an example, joining the first surrogate LPAR node may include updating a cluster configuration to include the first surrogate LPAR node in the same network group as the set of LPAR nodes, propagating the updated cluster configuration to the first surrogate LPAR node, and starting cluster software on the first surrogate LPAR node that corresponds to the cluster software used by other LPAR nodes of the set. In embodiments, IP addresses, communication ports, security protocols, and other parameters of the first surrogate LPAR node may be configured to conform to the parameters of the set of LPAR nodes. Other methods of joining the first surrogate LPAR node with the set of LPAR nodes are also possible.

In embodiments, in response to joining of the first surrogate LPAR node with the set of LPAR nodes, presence of twin nodes may be sensed at block 442. Generally, sensing can include detecting, probing, discovering, checking, distinguishing, or otherwise ascertaining the presence of twin nodes. In embodiments, the twin nodes may include LPAR nodes that substantially correspond to one another with respect to system configuration, functionality, hosted assets, or other criteria. In embodiments, the twin nodes may include LPAR nodes that share similar aspects but have different network role assignments (e.g., primary and secondary, active and standby). As described herein, aspects of the disclosure relate to generating a first surrogate LPAR node that is a copy (e.g., substantially same system configuration, parameters, assets) of the first original LPAR node, and incorporating it together with the set of LPAR nodes. Accordingly, in certain embodiments, the set of LPAR nodes may be configured to detect the presence of the first surrogate LPAR node, and ascertain that it substantially corresponds with the first original LPAR node. In embodiments, sensing may include probing one or more nodes of the set of LPAR nodes for a cluster identifier, and verifying that the cluster identifier for both the first original LPAR node and the first surrogate LPAR node are the same. In certain embodiments, sensing the presence of twin nodes may include making use of a cluster diagnostic tool to analyze the system configuration, network parameters, and set of assets of the set of LPAR nodes, and determining that the first original LPAR node and the first surrogate LPAR node achieve a mutual similarity threshold (e.g., based on the similarity between their respective configurations and hosted assets). Other methods of sensing the presence of twin nodes are also possible.

At block 450, the first surrogate LPAR node may be identified as a new surrogate LPAR node. The first surrogate LPAR node may be identified as a new surrogate LPAR node in response to the first surrogate LPAR node joining the set of LPAR nodes. Generally, identifying can include detecting, classifying, sensing, categorizing, or otherwise determining the first surrogate LPAR node as a new surrogate LPAR node. The new surrogate LPAR node may include an LPAR node that is considered to be a member of the set of LPAR nodes while remaining separate from the set of established members. In embodiments, identifying can include introducing a cluster protocol to communicate to other LPAR nodes of the set of LPAR nodes that the first surrogate LPAR node is a new surrogate LPAR node being prepared for cluster service. In embodiments, identification of the first surrogate LPAR node as a new surrogate node may influence how failback and failover operations are handled with respect to the first surrogate LPAR node. For instance, in certain embodiments, aspects of the disclosure relate to refraining from utilizing surrogate LPAR nodes for failover-failback operations (e.g., and prioritizing established members for failover-failback operations). Accordingly, in certain embodiments, identifying the first surrogate LPAR node as a new surrogate LPAR node may include configuring a failover-failback logic protocol for the first set of LPAR nodes. For instance, the failover-failback logical protocol may include a set of failover-failback utilization permissions that designate which LPAR nodes may be utilized for failover-failback management. In embodiments, the failover-failback utilization positions may be configured to prevent utilization of the first surrogate LPAR node for failover-failback management. As an example, in the event of a failover event subsequent to identification of the first surrogate LPAR node as a new surrogate LPAR node, the first original LPAR node or other established members may be utilized to handle the failover event. Other methods of identifying the first surrogate LPAR node as a new surrogate LPAR node are also possible.

In embodiments, a cluster state of the first original LPAR node with respect to handling a set of failover-failback operations may be learned at block 454. The cluster state of the first original LPAR node may be learned in a dynamic fashion by the first surrogate LPAR node. Generally, learning can include acquiring, obtaining, detecting, or otherwise determining the cluster state of the first original LPAR node.

The cluster state may include a set of protocols or parameters that define, govern, or regulate how assets maintained on LPAR nodes should be handled in case of a failover-failback event. As described herein, aspects of the disclosure relate to replacing the first original LPAR node with a first surrogate LPAR node having an upgraded configuration. Accordingly, the first surrogate LPAR node may acquire the cluster state of the first original LPAR node such that the first surrogate LPAR node may be utilized for failover-failback operations in case of a failover-failback event. In embodiments, learning may include analyzing a failover-failback management policy of the first original LPAR node, and configuring a set of failover-failback management parameters of the first surrogate LPAR node to match those of the first original LPAR node. In embodiments, learning may include directly importing the failover-failback management policy of the first original LPAR node. As an example, the failover-failback management policy may indicate particular assets that should be migrated to other LPAR nodes, particular assets that should be modified, communication protocols that should be reconfigured, or other actions to take in case of a failover-failback event. Other methods of learning the cluster state of the first original LPAR node with respect to handling a set of failover-failback operations are also possible.

At block 460, the first surrogate LPAR node may be established as the first established member of the set of established members to facilitate utilization of the set of successor assets. Establishing the first surrogate LPAR node as the first established member may thereby remove the first original LPAR node from the set of established members. Generally, establishing can include inaugurating, installing, authorizing, inducting, or otherwise setting-up the first surrogate LPAR node as the first established member of the set of LPAR nodes. As described herein, aspects of the disclosure relate to replacing the first original LPAR node with a first surrogate LPAR node having an upgraded configuration (e.g., updated cluster software). In embodiments, establishing may include tagging a data entry corresponding to the first surrogate LPAR node with an established membership tag in a network logical topology database. The established membership tag may designate the first surrogate LPAR node as an established member of the set of LPAR nodes. In embodiments, establishing the first surrogate LPAR node as the first established member may include configuring a failover-failback logical protocol for the first set of LPAR nodes. As described herein, in certain embodiments, aspects of the disclosure relate to utilizing LPAR nodes that are included in the set of established members for failover-failback operations. Accordingly, in response to establishing the first surrogate LPAR node as the first established member, a set of failover-failback utilization permissions may be configured to permit utilization of the first surrogate LPAR node for failover-failback management. In certain embodiments, establishing the first surrogate LPAR node may include removing the first original LPAR node from the set of established members. For instance, cluster services running on the first original LPAR node may be ceased, and the set of failover-failback utilization permissions may be configured to prevent utilization of the first original node for failover-failback operations (e.g., as cluster services and failover-failback operations can be handled by the first surrogate LPAR node). Other methods of establishing the first surrogate LPAR node as the first established member of the set of established members are also possible.

Consider the following example. A set of LPARs may include a plurality of LPAR nodes. A pending LKU operation may be detected with respect to a first original LPAR node of the set of LPARs. In response to detecting the pending LKU operation for the first original LPAR node, a first surrogate LPAR node may be generated that corresponds to the first original LPAR node. In embodiments, an updated/upgraded configuration (e.g., cluster software, operating system) may be installed on the first surrogate LPAR node. In embodiments, the first original LPAR node may continue cluster operations while preparation of the first surrogate LPAR node is being performed. In embodiments, the first surrogate LPAR node may be identified as a new original LPAR node such that the first surrogate LPAR node is viewed by the cluster as a newly added cluster node (e.g., available for use in failover-failback management operations). In embodiments, the first surrogate LPAR node may join the first surrogate LPAR node. In response to joining the set of LPAR nodes, the first surrogate LPAR node may be identified as a new surrogate LPAR node. As described herein, aspects of the disclosure relate to refraining from utilization of surrogate LPAR nodes for failover-failback management operations. In response to joining the set of LPAR nodes, the first surrogate LPAR node may import a cluster state from the first original LPAR node in order to learn how to manage cluster assets (e.g., the set of successor assets) in the case of a failover-failback event. In embodiments, the first surrogate LPAR node may be established as the first established member of the set of LPAR nodes (e.g., in response to completion of update/upgrade operations and cluster state learning on the first surrogate LPAR node), and cluster service on the first original LPAR node may be ceased. In this way, upgrade operations for the set of logical nodes may be facilitated while maintaining continuous availability for cluster assets. Other ways of managing upgrade operations for LPAR clusters are also possible.

Method 400 concludes at block 499. As described herein, aspects of method 400 relate to dynamically (e.g., in real-time, ongoing, on-the-fly) upgrading a set of LPAR nodes using a surrogate LPAR node in a singular fashion. Aspects of method 400 may provide performance or efficiency benefits for LPAR cluster upgrade management. As an example, maintaining cluster services using original LPAR nodes while performing upgrade operations with respect to surrogate LPAR nodes may be associated with continuous asset availability and reduced system downtime (e.g., cluster operations are continued by existing nodes until replacement by updated LPAR nodes). Altogether, leveraging surrogate nodes for dynamic live kernel update with respect to a cluster of LPAR nodes may be associated with reduced downtime, application availability streamlined system upgrades, and cluster reliability.

Figure 5:
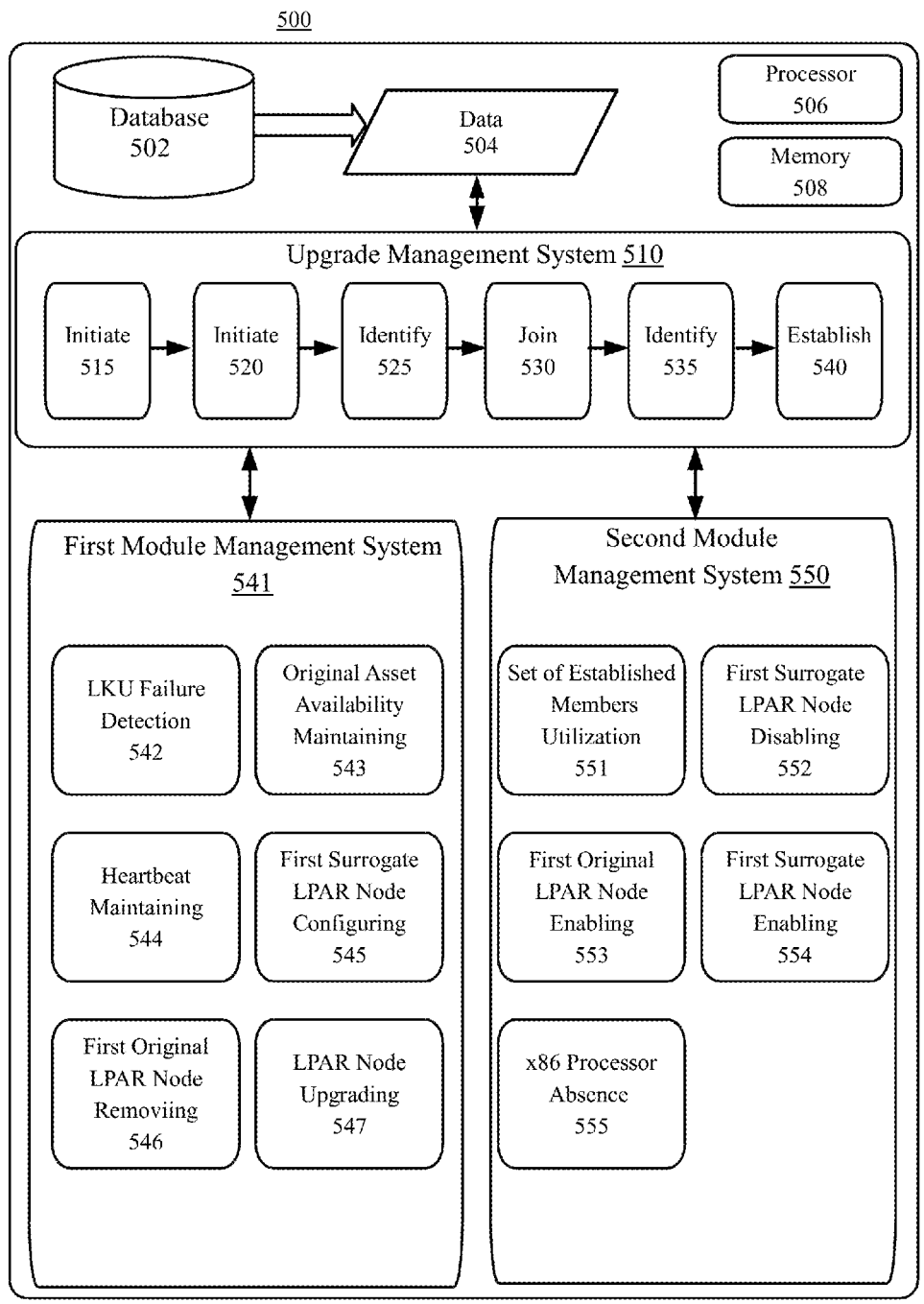
FIG. 5 shows an example system for upgrade management for a shared pool of configurable computing resources having a set of logical partition (LPAR) nodes which includes a set of established members, according to embodiments.

FIG. 5 shows an example system 500 for upgrade management for a shared pool of configurable computing resources having a set of logical partition (LPAR) nodes which includes a set of established members, according to embodiments. Aspects of FIG. 5 relate to dynamically (e.g., in real-time, ongoing, on-the-fly) upgrading a set of LPAR nodes using a surrogate LPAR node in a singular fashion. The example system 500 may include a processor 506 and a memory 508 to facilitate implementation of upgrade management. The example system 500 may include a database 502 (e.g., upgrade management database) configured to provide notifications and alerts of pending upgrades or updates to particular LPAR nodes. In embodiments, the example system 500 may include an upgrade management system 510. The upgrade management system 510 may be communicatively connected to the database 502, and be configured to receive data 504 (e.g., notifications of cluster software upgrades) related to LPAR node updates. The upgrade management system 510 may include a first initiating module 515 configured to initiate performance of a LKU operation with respect to a first original LPAR node, a second initiating module 520 configured to initiate generation of a first surrogate LPAR node to succeed the first original LPAR node as a first established member, a first identifying module 525 configured to identify the first surrogate LPAR node as a new original LPAR node, a joining module 530 configured to join the first surrogate LPAR node with the set of LPAR nodes, a second identifying module 535 to identify the first surrogate LPAR node as a new surrogate LPAR node, and an establishing module 540 to establish the first surrogate LPAR node as the first established member of the set of established members. The operational steps described herein may be performed dynamically (e.g., in real-time, ongoing, on-the-fly) to streamline upgrade management for a set of LPAR nodes. The upgrade management system 510 may be communicatively connected with a first module management system 541 and a second module management system 550 that each include one or more modules for implementing aspects of upgrade management.

In embodiments, a failure of an LKU operation may be detected at module 542. Generally, detecting can include sensing, recognizing, discovering, identifying, ascertaining, or otherwise determining that the LKU operation has failed. Aspects of the disclosure relate to the recognition that, in certain situations, an LKU operation initiated with respect to an LPAR node may fail to complete as the result of an error event, software or hardware incompatibility, network outage, or other irregularity. In embodiments, detecting failure of the LKU operation may include using an LKU management widget to monitor progress of the LKU operation, and ascertaining that the LKU operation has encountered an error (e.g., time out error). In embodiments, aspects of the disclosure relate to maintaining availability of the set of original assets at module 543. Generally, maintaining can include managing, preserving, protecting, or continuing availability of the set of original assets. In embodiments, maintaining availability of the set of original assets may include initiating migration of the set of original assets to one or more other established members of the LPAR cluster.

Consider the following example. An LKU operation may be initiated with respect to a first original LPAR node having a set of original assets. A first surrogate LPAR node corresponding to the first original LPAR node may be generated, and an upgrade host server may initiate installation of an upgraded cluster software version to the first surrogate LPAR node. Prior to completion of the upgrade installation, a network outage may interrupt communication between the upgrade host server and the first surrogate LPAR node, resulting in failure of the LKU operation. Accordingly, the first original LPAR node may evaluate the operational status of other established members of the set of LPAR nodes, and identify one or more potential hosts for the set of original assets. Accordingly, the set of original assets may be migrated to the one or more potential hosts to maintain asset availability. Other methods of detecting LKU operation failure and maintaining availability of the set of original assets are also possible.

In embodiments, a heartbeat with the first original LPAR node may be maintained at module 544. The heartbeat may be maintained with the first original LPAR node until the first surrogate LPAR node is established as the first established member of the set of established members. Generally, maintaining can include continuing, proceeding, persisting, advancing, or otherwise carrying on the heartbeat. As described herein, aspects of the disclosure relate to using the first original LPAR node to continue communication (e.g., and cluster activities) with one or more other LPAR nodes in the set of LPAR nodes until establishment as the first surrogate LPAR node as an established member of the set of LPAR nodes. Accordingly, in embodiments, a heartbeat signal may be maintained with the first original LPAR node to verify its operational status (e.g., until it is replaced by the first surrogate LPAR node). The heartbeat may include a periodically generated signal or notification to indicate normal operation to other nodes of the network (e.g., if a heartbeat isn't received for a threshold time period, the machine that should have sent the heartbeat may be assumed to have encountered an error/failed). For instance, the first original LPAR node may be configured to use a plurality of heartbeat protocols running over one or more communication channels (e.g., Ethernet, Transmission Control Protocol/Internet Protocol, User Datagram Protocol, serial link) to other LPAR nodes to indicate its operational state. Other methods of maintaining heartbeat with the first original LPAR node are also possible.

In embodiments, the first surrogate LPAR node may be configured with the set of successor assets at module 545. The first surrogate LPAR node may be configured in advance of establishing the first surrogate LPAR node as the established member of the set of established members. Generally, configuring can include arranging, installing, upgrading, instantiating, or otherwise setting up the first surrogate LPAR node. As described herein, aspects of the disclosure relate to a first surrogate LPAR node having a set of successor assets including one or more workloads, applications, software programs, or other data or information to replace the set of original assets. As an example, the set of successor assets may include an updated cluster software version with respect to that maintained on the first original LPAR node (e.g., software version 7.4 versus software version 7.3). In embodiments, configuring the first surrogate LPAR node may include installing a new (e.g., newest, up-to-date) cluster software version on the first surrogate LPAR node (e.g., fresh install). In certain embodiments, configuring the first surrogate LPAR node may include copying the current cluster software from the first original node to the first surrogate LPAR node, and subsequently upgrading it to a newer version. Other methods of configuring the first surrogate LPAR node with the set of successor assets are also possible.

In embodiments, the first original LPAR node may be removed from the set of LPAR nodes at module 546. The first original LPAR node may be removed in response to establishing the first surrogate LPAR node as the first established member of the set of established members. Generally, removing can include shutting down, replacing, deleting, discarding, disabling, or otherwise taking the first original LPAR node out of the set of LPAR nodes. As described herein, aspects of the disclosure relate to replacing the first original LPAR node with the first surrogate LPAR node to facilitate upgrade management for a set of LPAR nodes. Accordingly, in embodiments, once the first original LPAR node has been established as the first established member of the set of established members (e.g., asset transfer/upgrade on the first surrogate LPAR node has been completed), the first original LPAR node may be removed from the set of LPAR nodes. In embodiments, removing can include ceasing cluster services or activities on the first original LPAR node. In certain embodiments, removing may include deleting the set of original assets from the first original LPAR node. For instance, the first original LPAR node may be reformatted to erase data and configuration settings corresponding to the set of LPAR nodes, and the disk space occupied by the first original LPAR node may be cleared for use by other data and applications. Other methods of removing the first original LPAR node from the set of LPAR nodes are also possible.

In embodiments, the set of LPAR nodes may be upgraded using the first surrogate LPAR node in a singular fashion at module 547. The set of LPAR nodes may be upgraded without creating a redundant set of LPAR nodes (e.g., an entire duplicate set of LPAR nodes thereby essentially duplicating usage of system resources). Generally, upgrading can include renewing, restoring, repairing, modifying, or otherwise updating the set of LPAR nodes. Aspects of the disclosure relate to the recognition that, in certain situations, performing upgrades with respect to a set of LPAR nodes may result in system downtime (e.g., nodes are taken down for upgrade), service unavailability (e.g., services/applications halted during upgrade), or excessive disk space usage (e.g., a plurality of new LPAR nodes are created and swapped with existing nodes, occupying additional storage resources). Accordingly, aspects of the disclosure relate to performing updates or upgrades with respect to a single surrogate LPAR node that may then be joined to the set of LPAR nodes upon upgrade completion, such that system downtime, service unavailability, and excessive disk space usage can be avoided. In embodiments, the upgrade process may be repeated for multiple LPAR nodes (e.g., one-at-a-time, round robin fashion) to facilitate upgrades for the set of LPAR nodes. Other methods of upgrading the set of LPAR nodes are also possible.

In embodiments, the set of established members may be utilized with respect to handling a set of failover-failback operations at module 551. Generally, utilizing can include employing, permitting, allowing, applying, or otherwise using the set of established members with respect to handling a set of failover-failback operations. In embodiments, aspects of the disclosure relate to the recognition that, in the case of a failover-failback event, it may be desirable to make use of those LPAR nodes that are configured to perform failover-failback management operations. Accordingly, in embodiments, aspects of the disclosure relate to utilizing the set of established members (e.g., LPAR nodes configured with protocols for failover-failback management) for failover-failback operations. As an example, in the event of a failover-failback event, the set of established members may be used to transfer and migrate hosted assets (e.g., applications, workloads) between nodes, perform administrative actions (e.g., node quarantine, node fencing), and carry-out other failover-failback management procedures. Other methods of utilizing the set of established members with respect to handling the set of failover-failback operations are also possible.

In embodiments, utilization of the first surrogate LPAR node to handle the set of failover-failback operations may be disabled at module 552. Utilization of the first surrogate LPAR node may be disabled in response to identifying the first surrogate LPAR node as the new surrogate LPAR node. Generally, disabling can include preventing, denying, reducing, regulating, or otherwise limiting utilization of the first LPAR node to handle the set of failover-failback operations. In embodiments, aspects of the disclosure relate to the recognition that, at certain stages in the process of preparing the first surrogate LPAR node for inclusion in the set of LPAR nodes, the first surrogate LPAR node may not be configured for handling of failover-failback operations. For instance, system resources of the first surrogate LPAR node may be being utilized for installation of upgraded cluster software, such that it does not have sufficient resources available for failover-failback operations. As another example, in response to the first surrogate LPAR node being identified as the new surrogate LPAR node, the set of LPAR nodes may detect that the first surrogate LPAR node has not acquired (e.g., learned) a cluster state of the first original LPAR node to configure it for handling of failover-failback operations. Accordingly, the first surrogate LPAR node may be prevented from involvement in a set of failover-failback operations. In embodiments, disabling utilization of the first surrogate LPAR node may include modifying a set of failover-failback utilization permissions, and designating that the first surrogate LPAR node is not allowed to be used for failover-failback operations. Other methods of disabling utilization of the first surrogate LPAR node to handle the set of failover-failback operations are also possible.

In embodiments, utilization of the first original LPAR node to handle the set of failover-failback operations may be enabled at module 553. Utilization of the first original LPAR node to handle the set of failover-failback operations may be enabled in advance of establishing the first surrogate LPASR node as the first established member of the set of established members. Generally, enabling can include allowing, authorizing, approving, implementing, or otherwise permitting utilization of the first original LPAR node to handle the set of failover-failback operations. In embodiments, aspects of the disclosure relate to continuing to use the first original LPAR node for failover-failback operations until the first surrogate LPAR node is established as an established member in the set of LPAR nodes. In embodiments, enabling the first original LPAR node to handle the set of failover-failback operations may include modifying a set of failover-failback utilization permissions, and designating that the first original LPAR node is allowed to be used for failover-failback operations in the case of a failover-failback event. As an example, in the case that a failover-failback event occurs such that a second original LPAR node is unable to maintain its hosted workloads, the assets of the second original LPAR node may be migrated to the first original LPAR node to maintain service and application availability. Other methods of enabling the first original LPAR node to handle the set of failover-failback operations are also possible.

In embodiments, utilization of the first surrogate LPAR node to handle the set of failover-failback operations may be enabled at module 554. Utilization of the first surrogate LPAR node to handle the set of failover-failback operations may be enabled in response to establishing the first surrogate LPAR node as the first established member of the set of established members. Generally, enabling can include allowing, authorizing, approving, implementing, or otherwise permitting utilization of the first surrogate LPAR node to handle the set of failover-failback operations. In embodiments, aspects of the disclosure relate to replacing the first original LPAR node with a first surrogate LPAR node (e.g., having an upgraded configuration) such that the first surrogate LPAR node succeeds the first original LPAR node as the first established member of the set of established members. Accordingly, in response to establishing the first surrogate LPAR node as the first established member, the first surrogate LPAR node may be enabled for utilization as part of the set of failover-failback operations. For instance, the set of LPAR nodes may detect that the first surrogate LPAR node has acquired a cluster state (e.g., protocol, set of instructions) from the first original LPAR node with respect to handling a set of failover-failback operations. As such, in response to determining that the first surrogate LPAR node is configured to handle the set of failover-failback operations, a set of failover-failback permissions of the failover-failback management policy may be modified to permit utilization of the first surrogate LPAR node for failover-failback management operations. Other methods of enabling the first surrogate LPAR node to handle the set of failover-failback operations are also possible.

In embodiments, an x86 processor may be absent with respect to the shared pool of configurable computing resources at module 555. x86 processors may utilize software hypervisors for virtualization. x86 processors can have additional layers with respect to non-x86 processors. In certain embodiments, support for a hypervisor is built into the chip (e.g., embedded firmware managing the processor and memory resources). Accordingly, the hypervisor may run as a piece of firmware code interacting with the hardware and virtual machines. In embodiments, the shared pool of configurable computing resources may make use of an advanced interactive executive (AIX) or Linux based system architecture. Other types of system architectures are also possible.

Figure 6:
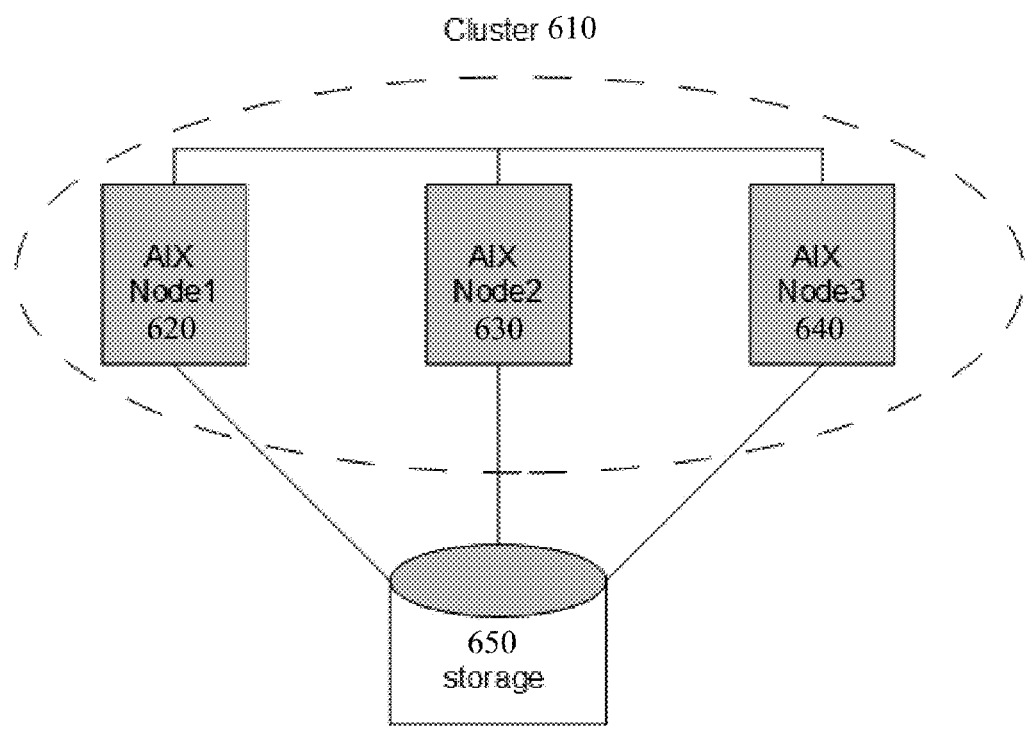
FIG. 6 shows an example network infrastructure for upgrade management of a set of LPAR nodes, according to embodiments.

FIG. 6 shows an example network infrastructure 600 for upgrade management of a set of LPAR nodes. Aspects of FIG. 6 relate to an initial configuration of a node cluster 610 for initiation of an LKU operation. The node cluster 610 may have a plurality of LPAR nodes including a node 620, a node 630, and a node 640. In embodiments, one or more LPAR nodes of the node cluster 610 may be configured to use an AIX system architecture. As shown in FIG. 6, the node cluster 610 may be connected to a common storage system 650. The common storage system 650 may include a shared storage server, network attached storage (NAS) device, database, or other form of data storage. In embodiments, as described herein, one or more pending upgrades may be detected with respect to one or more LPAR nodes of the node cluster 610. As an example, a new cluster software version may be detected for node 620. Accordingly, as described herein, an LKU operation may be initiated with respect to node 620. The LKU operation may include generation of a surrogate LPAR node to facilitate upgrades to the node cluster 610. Other methods of upgrade management are also possible.

Figure 7:
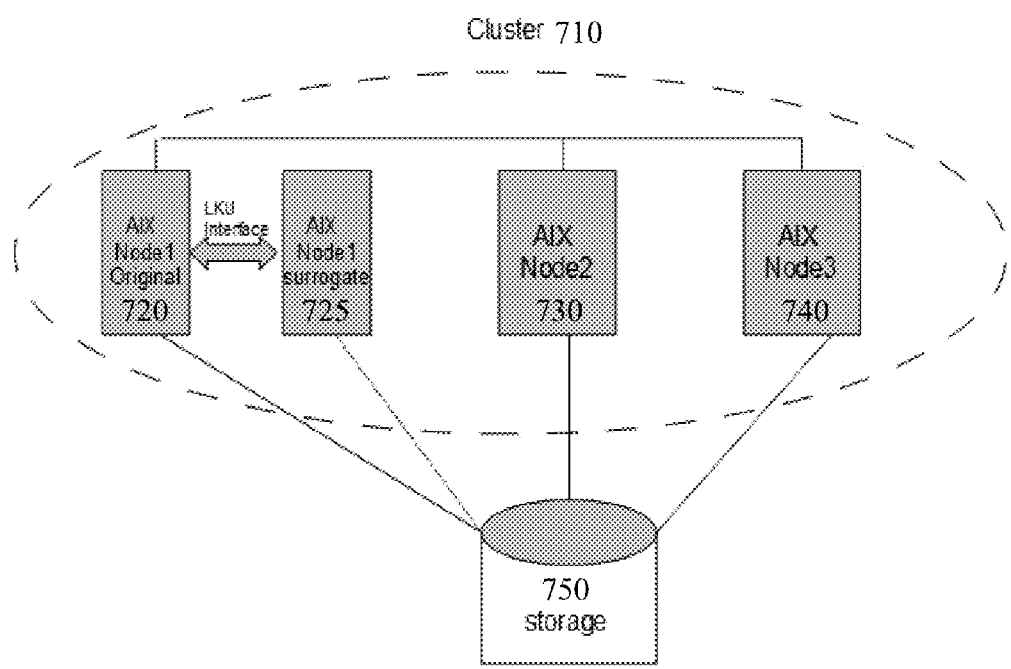
FIG. 7 shows an example network infrastructure for upgrade management of a set of LPAR nodes, according to embodiments.

FIG. 7 shows an example network infrastructure 700 for upgrade management of a set of LPAR nodes. Aspects of FIG. 7 relate to an intermediary configuration of a node cluster 710 for generation of a surrogate LPAR node to facilitate upgrade management. The node cluster 710 may include an original node 720, a node 730, and a node 740 communicatively connected to a common storage device 750. In embodiments, as described herein, in response to initiation of an LKU operation with respect to the original node 720, a surrogate node 725 may be generated for the original node 720. The surrogate node 725 may include a copy, reproduction, substitute, or virtualized duplicate of the original node 720. In embodiments, one or more upgrades or updates of the LKU operation may be performed with respect to the surrogate node 725. For instance, installation of an updated cluster software version may be initiated on the surrogate node 725. During preparation (e.g., formatting, configuration, upgrade installation) of the surrogate node 725, the original node 720 may continue cluster service activities, and maintain a heartbeat protocol with one or more other LPAR nodes of the node cluster 710 (e.g., using Transmission Control Protocol/Internet Protocol). In the event that communication with original node 720 is lost (e.g., as the result of an error event), a failover-failback policy may be used to determine one or more other LPAR nodes (e.g., node 730, node 740) to assume the assets and network duties of the original node 720. In the event that the surrogate node 725 fails (e.g., as the result of an error event, communication interruption, LKU failure) prior to upgrade completion, the original node 720 may continue cluster activities without service interruption, and the LKU operation may be reinstated. In response to completion of the upgrade with respect to the surrogate node 725, the surrogate node 725 may join the node cluster 710 and begin cluster services with the updated cluster software version. Other methods of upgrade management are also possible.

Figure 8:
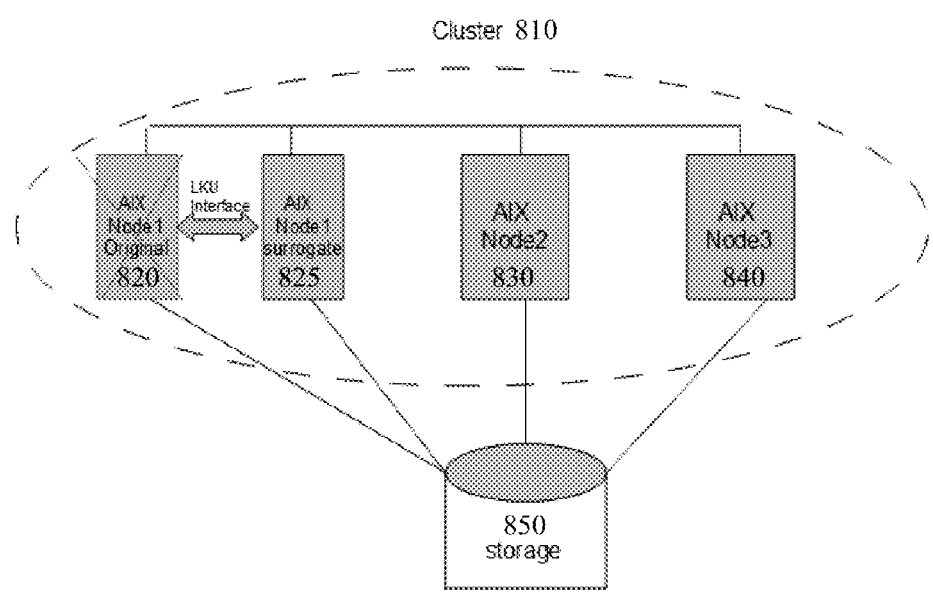
FIG. 8 shows an example network infrastructure for upgrade management of a set of LPAR nodes, according to embodiments.

FIG. 8 shows an example network infrastructure 800 for upgrade management of a set of LPAR nodes. Aspects of FIG. 8 relate to a final configuration of a node cluster 810 for replacement of an original LPAR node with an upgraded surrogate LPAR node. The node cluster 810 may include an original node 820, a surrogate node 825, a node 830, and a node 840 communicatively connected to a common storage device 850. The surrogate node 825 may include an updated or upgraded system configuration (e.g., cluster software version) with respect to the original node 820. As describe herein, aspects of the disclosure relate to inducting the surrogate node 825 into the node cluster 810 as an established member, and removing the original node 820 from the node cluster 810. For instance, the surrogate node 825 may take over cluster service activities from the original node 820, and the original node 820 may be deleted from the node cluster 810. In the event that a LPAR node of the node cluster 810 experiences a failure, the surrogate node 825 may be utilized to facilitate failover-failback operations. In this way, upgrades to the LPAR nodes of the node cluster 810 may be performed so as to maintain application and service availability while avoiding system downtime and disk storage usage.

Figure 9:
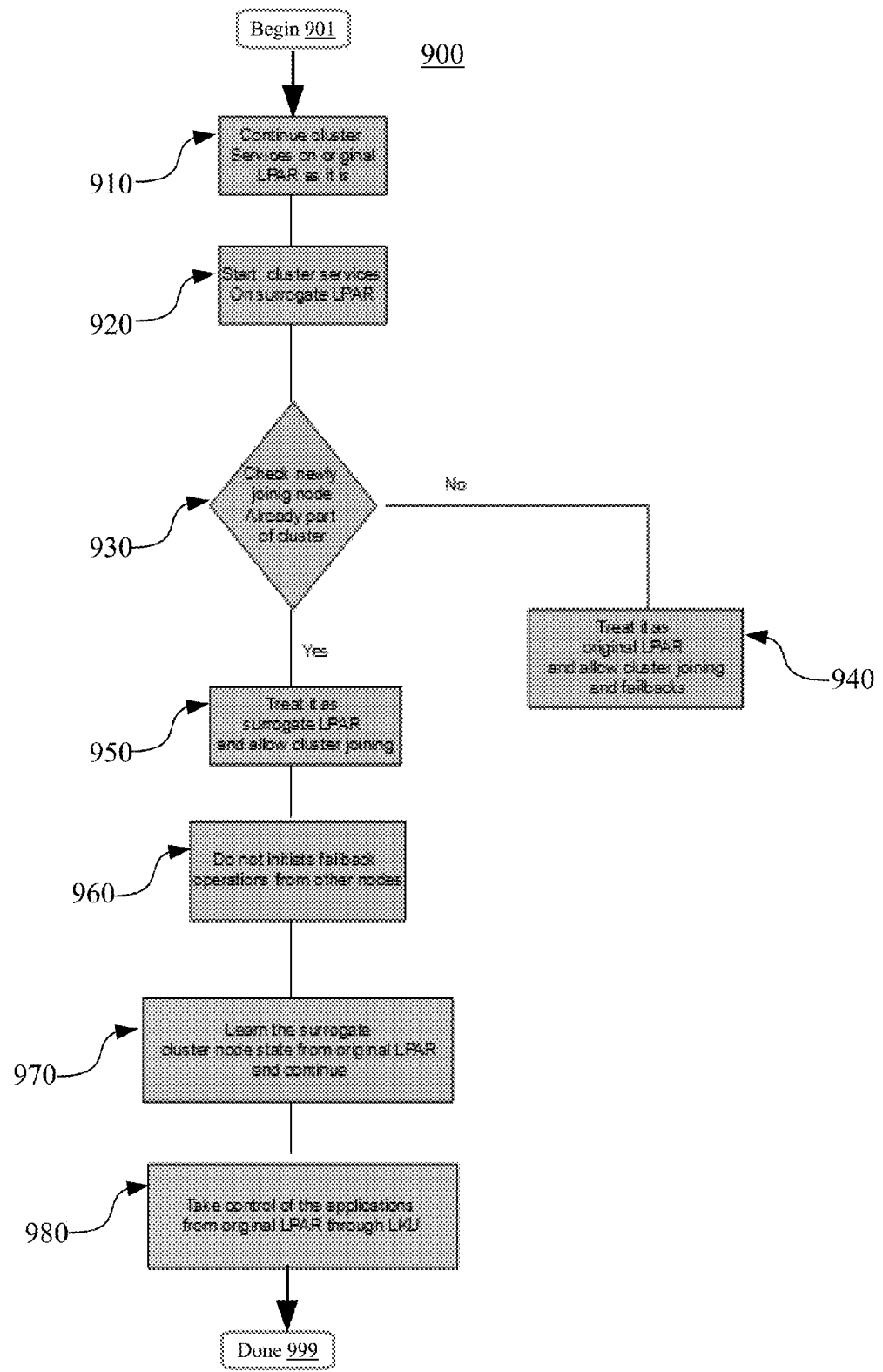
FIG. 9 is a flowchart illustrating a method of upgrade management for a shared pool of configurable computing resources having a set of logical partition (LPAR) nodes which includes a set of established members, according to embodiments.

FIG. 9 is a flowchart illustrating a method 900 of upgrade management for a shared pool of configurable computing resources having a set of logical partition (LPAR) nodes which includes a set of established members. Aspects of FIG. 9 relate to a join protocol for inducting an upgraded surrogate LPAR node into a set of LPAR nodes. Aspects of FIG. 9 may substantially correspond to other embodiments described herein and illustrated in the FIGS. 1-9. The method 900 may begin at block 901.

In embodiments, prior to joining of a surrogate LPAR node into a set of LPAR nodes, cluster services may be continued on an original LPAR node at block 910. The original LPAR node may continue a heartbeat protocol with one or more other LPAR nodes of the set of LPAR nodes, as well as maintain application and service availability. At block 920, cluster services may be initiated on the surrogate LPAR node. For instance, cluster communication software may be started on the surrogate LPAR node. At block 930, it may be ascertained whether or not the surrogate LPAR node is already a part of the cluster (e.g., set of LPAR nodes). In the event that it is determined that the surrogate LPAR node is not yet a part of the cluster, the method 900 may proceed to block 940, where the surrogate LPAR node may be treated as an original LPAR node and allowed to join the cluster and participate in failover-failback operations. In the event that it is determined that the surrogate LPAR node is already a part of the cluster, the method 900 may proceed to block 950, where the surrogate LPAR node may be identified as a new surrogate node and allowed to join the cluster. As described herein, at block 960, aspects of the disclosure relate to preventing surrogate LPAR nodes from being used for failover-failback operations (e.g., the surrogate LPAR nodes may not be configured to handle failover-failback operations; upgrade operations may not yet be complete). In embodiments, at block 970, the surrogate LPAR node may be configured to learn a cluster state (e.g., protocol for managing failover-failback operations) from the original LPAR node. At block 980 (e.g., in response to learning the cluster state), the surrogate LPAR node may assume control of the applications and services of the original LPAR node, and the original LPAR node may be removed from the cluster. Accordingly, upgrades to the LPAR nodes of the node cluster may be performed so as to maintain application and service availability while avoiding system downtime and disk storage usage. The method may conclude at block 999. Other methods of upgrade management for a set of LPAR nodes are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method of upgrade management for a shared pool of configurable computing resources having a set of logical partition (LPAR) nodes which includes a set of established members, the method comprising:

initiating, with respect to a first original LPAR node which has a set of original assets, performance of a live kernel update (LKU) operation;

initiating, to succeed the first original LPAR node as a first established member of the set of established members, generation of a first surrogate LPAR node which has a set of successor assets to succeed the set of original assets;

identifying, pertaining to LPAR node management in advance of the first surrogate LPAR node joining the set of LPAR nodes, the first surrogate LPAR node as a new original LPAR node;

joining the first surrogate LPAR node with the set of LPAR nodes;

identifying, pertaining to LPAR node management in response to the first surrogate LPAR node joining the set of LPAR nodes, the first surrogate LPAR node as a new surrogate LPAR node; and establishing, to facilitate utilization of the set of successor assets, the first surrogate LPAR node as the first established member of the set of established members thereby removing the first original LPAR node from the set of established members.

2. The method of claim 1, further comprising:
initiating, when the set of original assets are running on the first original LPAR node, performance of the LKU operation.

3. The method of claim 1, further comprising:
initiating, when the set of original assets are running on the first original LPAR node, generation of the first surrogate LPAR node which has the set of successor assets to succeed the set of original assets.

4. The method of claim 1, further comprising:
sensing, in response to joining of the first surrogate LPAR node with the set of LPAR nodes, presence of twin nodes.

5. The method of claim 1, further comprising:
learning, in a dynamic fashion by the first surrogate LPAR node, a cluster state of the first original LPAR node with respect to handling a set of failover-failback operations.

6. The method of claim 1, further comprising:
detecting a failure of the LKU operation; and
maintaining availability of the set of original assets.

7. The method of claim 1, further comprising:
maintaining, pertaining to LPAR node management, a heartbeat with the first original LPAR node until the first surrogate LPAR node is established as the first established member of the set of established members.

8. The method of claim 1, further comprising:
configuring, in advance of establishing the first surrogate LPAR node as the first established member of the set of established members, the first surrogate LPAR node with the set of successor assets.

9. The method of claim 1, further comprising:
utilizing, with respect to handling a set of failover-failback operations, the set of established members.

10. The method of claim 9, further comprising:
disabling, in response to identifying the first surrogate LPAR node as the new surrogate LPAR node, utilization of the first surrogate LPAR node to handle the set of failover-failback operations.

11. The method of claim 10, further comprising:
enabling, in advance of establishing the first surrogate LPAR node as the first established member of the set of established members, utilization of the first original LPAR node to handle the set of failover-failback operations.

12. The method of claim 11, further comprising:
enabling, in response to establishing the first surrogate LPAR node as the first established member of the set of established members, utilization of the first surrogate LPAR node to handle the set of failover-failback operations.

13. The method of claim 1, further comprising:
removing, in response to establishing the first surrogate LPAR node as the first established member of the set of established members, the first original LPAR node from the set of LPAR nodes.

14. The method of claim 1, further comprising:
upgrading, using the first surrogate LPAR node in a singular fashion, the set of LPAR nodes without creating a redundant set of LPAR nodes.

15. The method of claim 1, wherein an x86 processor is absent with respect to the shared pool of configurable computing resources.

16. The method of claim 1, wherein the set of operational steps each occur in a dynamic fashion to streamline upgrade management.

17. The method of claim 1, wherein the set of operational steps each occur in an automated fashion without user intervention.

18. A system of upgrade management for a shared pool of configurable computing resources having a plurality of logical partition (LPARs) nodes which includes a set of established members, the system comprising:
a memory having a set of computer readable computer instructions, and
a processor for executing the set of computer readable instructions, the set of computer readable instructions including:
initiating, with respect to a first original LPAR node which has a set of original assets, performance of a live kernel update (LKU) operation;
initiating, to succeed the first original LPAR node as a first established member of the set of established members, generation of a first surrogate LPAR node which has a set of successor assets to succeed the set of original assets;
identifying, pertaining to LPAR node management in advance of the first surrogate LPAR node joining the set of LPAR nodes, the first surrogate LPAR node as a new original LPAR node;
joining the first surrogate LPAR node with the set of LPAR nodes;
identifying, pertaining to LPAR node management in response to the first surrogate LPAR node joining the set of LPAR nodes, the first surrogate LPAR node as a new surrogate LPAR node; and
establishing, to facilitate utilization of the set of successor assets, the first surrogate LPAR node as the first established member of the set of established members thereby removing the first original LPAR node from the set of established members.

19. A computer program product of upgrade management for a shared pool of configurable computing resources having a plurality of logical partition (LPARs) nodes which includes a set of established members, the computer program product comprising a computer readable storage medium having program instructions embodied therewith, wherein the computer readable storage medium is not a transitory signal per se, the program instructions executable by a processor to cause the processor to perform a method comprising:
- initiating, with respect to a first original LPAR node which has a set of original assets, performance of a live kernel update (LKU) operation;
- initiating, to succeed the first original LPAR node as a first established member of the set of established members, generation of a first surrogate LPAR node which has a set of successor assets to succeed the set of original assets;
- identifying, pertaining to LPAR node management in advance of the first surrogate LPAR node joining the set of LPAR nodes, the first surrogate LPAR node as a new original LPAR node;
- joining the first surrogate LPAR node with the set of LPAR nodes;
- identifying, pertaining to LPAR node management in response to the first surrogate LPAR node joining the set of LPAR nodes, the first surrogate LPAR node as a new surrogate LPAR node; and
- establishing, to facilitate utilization of the set of successor assets, the first surrogate LPAR node as the first established member of the set of established members thereby removing the first original LPAR node from the set of established members.

20. The computer program product of claim 19, wherein at least one of:
- the program instructions are stored in the computer readable storage medium in a data processing system, and wherein the program instructions were downloaded over a network from a remote data processing system; or
- the program instructions are stored in the computer readable storage medium in a server data processing system, and wherein the program instructions are downloaded over a network to the remote data processing system for use in a second computer readable storage medium with the remote data processing system.

* * * * *